UNITED STATES PATENT OFFICE.

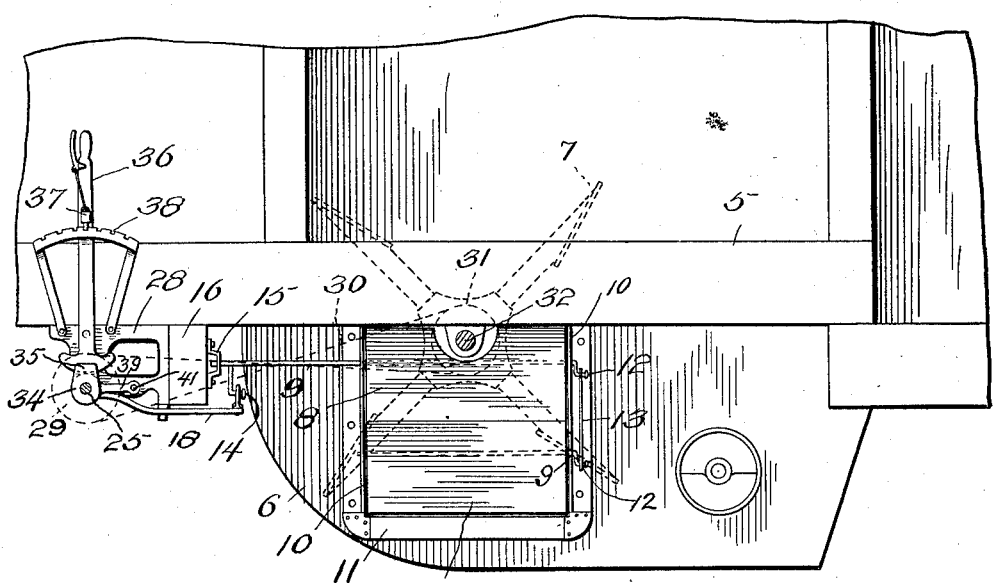

AUGUST B. PELLA, OF JESSIE, NORTH DAKOTA.

BLAST-REGULATOR.

1,007,970.

Specification of Letters Patent.

Patented Nov. 7, 1911.

Application filed March 30, 1911. Serial No. 617,894.

*To all whom it may concern:*

Be it known that I, AUGUST B. PELLA, a citizen of the United States, residing at Jessie, in the county of Griggs and State of North Dakota, have invented certain new and useful Improvements in Blast-Regulators, of which the following is a specification.

The blast regulator which is the subject of the present invention is designed more particularly for use in connection with threshing machines to regulate the force of the blast in proper proportion to the speed of the threshing mechanism. If the machine is slugged with bundles the speed is reduced, and then more wind is needed to clean the grain. On the other hand, if the feed is light the machine speeds up, and it is then necessary to reduce the blast in order to prevent the grain from being blown over the sieves.

The present invention automatically adjusts the wind boards of the fan blower casing according to the speed at which the machine is running, a centrifugal speed governor being provided which is geared to the driving means of the machine and operatively connected to the wind boards.

It is the object of the invention to provide a regulator of the kind stated which is simple in construction and perfectly reliable in operation, and which can be applied to any ordinary threshing machine without altering or modifying the structure thereof.

The invention also has for its object to provide a governing mechanism which can be set manually to fix the normal position of the wind boards according to the amount of wind required for different kinds and conditions of grain.

In order that the invention may be better understood, reference is had to the accompanying drawing forming a part of this specification, in which drawing—

Figure 1 is a side elevation of a fragment of a threshing machine showing the application of the invention. Figs. 2 and 3 are plan views, partly in section, of the mechanism in different positions. Fig. 4 is a perspective view of one of the parts of the governor-adjuster.

Referring specifically to the drawing, 5 denotes the frame work of the machine which supports the fan casing 6, the latter extending across the machine as usual and containing a blast fan 7 which is driven in any suitable manner from some moving part of the threshing mechanism. This structure is common in threshing machines and forms no part of the present invention.

In the ends of the fan casing are air inlet openings which are controlled by wind boards 8, two of such being provided for each opening. The wind boards are carried by rock shafts 9 which are journaled in outstanding flanges 10 of a frame 11 located on opposite sides of the inlet openings. The shafts of the respective pairs of wind boards have cranks 12 at one of their ends, which cranks are connected by pitmen 13, by reason of which connection the members of each pair of wind boards will swing together. At the other end of the shaft of one of the members of each pair of wind boards is a crank 14 which is connected to the governor mechanism as will be presently described. The shafts 9 are arranged horizontally, and when rocked in one direction they swing the wind boards outwardly to uncover the inlet openings of the fan casing more or less. When the shafts are rocked in the opposite direction, the windboards swing inwardly to close up the inlet openings more or less. In fully closed position the members of the respective pairs of wind boards are in vertical alinement and entirely cover the inlet openings, and in full open position, they extend horizontally, one above the other, in spaced relation.

The ends of the shafts 9 which have the cranks 14 are supported in bearings 15 carried by a cross sill 16 mounted on the bottom of the frame 5 of the machine.

The cross sill 16 carries a bearing 17 which forms the pivotal support of a lever 18 which is connected at one of its ends to a pitman 19 connecting the cranks 14. The other end of the lever is connected to the governor. The pitman 19 is in two sections connected by a turnbuckle 20 for the purpose of adjustment.

An ordinary centrifugal governor is shown, comprising bowed springs 21 carrying weights 22. The springs are made fast at their ends to collars 23 and 24, respectively. The collar 23 is made fast to the governor-shaft 25, and the collar 24 is loose on the end of said shaft so that it may slide thereon lengthwise. Between the collars is located a coiled spring 26 which opposes the outward swing of the weights. The collar 24 is connected by a link 27 to the lever 18.

The governor shaft is supported in a bearing bracket 28 carried by the cross sill 16, and it is movable lengthwise in said bearing. The governor shaft has a pulley 29 which is connected by a crossed belt 30 to a pulley 31 on the shaft 32 of the fan 7.

Loosely mounted on the governor shaft 25, between fixed collars 33 thereon, is a sleeve 34 having a pair of spaced ribs 35 extending obliquely with respect to the longitudinal axis of the shaft. In the oblique groove formed by these ribs works the toe of a hand lever 36 fulcrumed on the bearing bracket 28, and provided with a spring latch 37 adapted to engage a toothed sector 38 carried by the bracket, said latch serving to lock the lever.

The lever swings transversely of the governor shaft and by its engagement with the oblique groove operates to move said shaft in the direction of its length for a purpose to be presently made clear. Rotation of the sleeve 34 is prevented by an arm 39 extending therefrom and having an eye 40 at its outer end through which passes a stem 41 carried by the bearing bracket 28.

In operation, the governor will be adjusted by means of the hand lever 36 so that the fan when running at its ordinary rate of speed will give the proper blast according to the condition or kind of grain. The lever, as already described, moves the governor shaft lengthwise which movement spreads or draws in the weights 22, according to the direction in which the shaft is moved by the lever, and through the collar 24 swings the lever 18. The outward movement of the weights swings the lever in a direction to close the wind boards, and the opposite movement of the weights swings the lever in a direction to open the wind boards. After the adjustment is made, the device operates automatically, the extent of the opening and closing movement of the wind boards being proportionate to the extent of the swing of the governor weights. If the speed goes up, the governor weights fly outwardly, and the lever is then moved in a direction to close the wind boards more or less. If the speed drops, the weights swing back and the lever is moved in a direction to open the wind boards more or less. The collar 23 is so located with respect to the bearing bracket 28 that it comes in contact therewith when the governor weights have swung outwardly far enough to entirely close the wind boards, and the latter are thus held in this position until the speed goes down again.

The device requires but little power, and it can be readily attached to any ordinary threshing machine without altering or modifying the structure thereof. It can also be applied to fanning mills and other structures requiring a blast regulator.

I claim:

The combination with a fan casing; of wind boards over the inlets thereof, a governor controlling the wind boards, said governor being adjustable, and means for effecting adjustment of the governor, said means comprising a longitudinally movable governor shaft, fixed collars on said shaft, a sleeve loosely mounted on the shaft between the collars, said sleeve having a groove which extends obliquely to the longitudinal axis of the shaft, and a lever swinging transversely of the shaft and working in the groove.

In testimony whereof I affix my signature in presence of two witnesses.

AUGUST B. PELLA.

Witnesses:
HARRY ST. JOHN,
J. M. RESSLER.